June 5, 1956  B. A. PERRY ET AL  2,749,002
METHOD AND APPARATUS FOR EXHAUSTING INCANDESCENT LAMPS
Filed Jan. 28, 1954
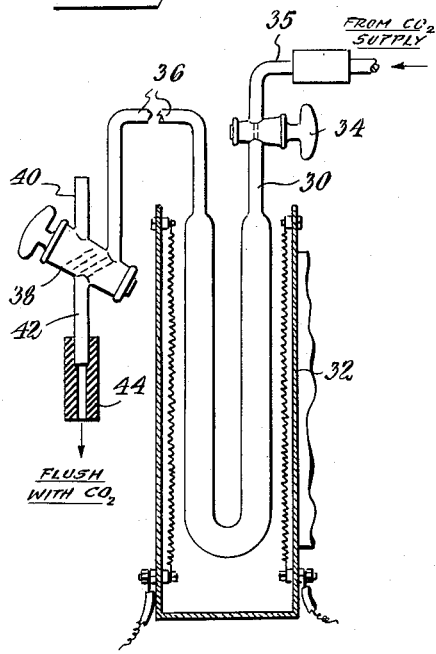
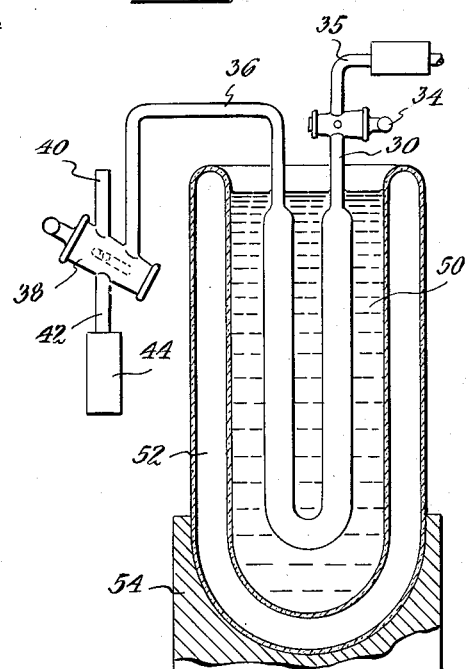
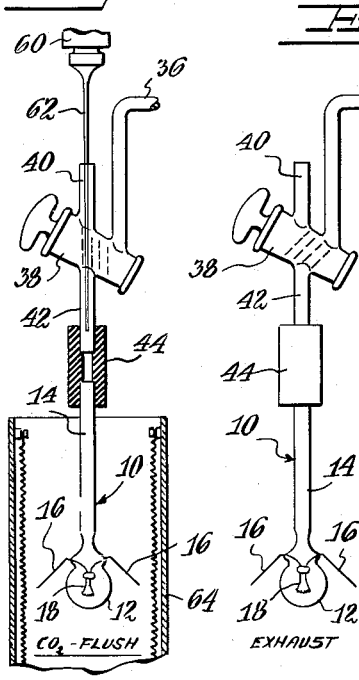
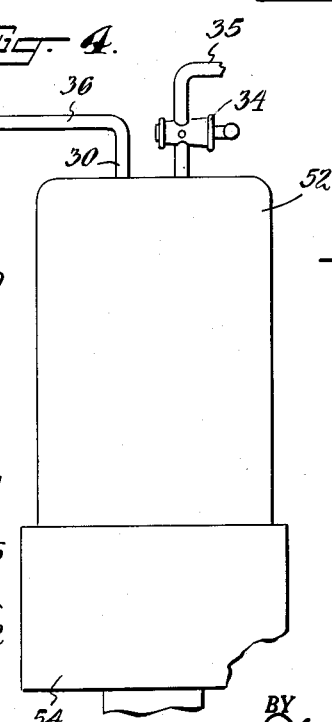
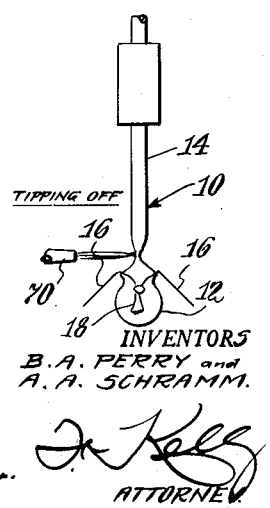
INVENTORS
B. A. PERRY and
A. A. SCHRAMM.
BY
ATTORNEY

United States Patent Office 2,749,002
Patented June 5, 1956

2,749,002

METHOD AND APPARATUS FOR EXHAUSTING INCANDESCENT LAMPS

Blanchard A. Perry, Port Murray, and Albert A. Schramm, Springfield, N. J., assignors to Westinghouse Electric Corporation, East Pittsburgh, Pa., a corporation of Pennsylvania Application January 28, 1954, Serial No. 406,678

4 Claims. (Cl. 226—20.1)

The present invention relates to the manufacture of incandescent lamps and, more particularly, to a method and apparatus for exhausting said lamps.

The present low cost per unit methods for manufacturing incandescent lamps, particularly lamps of the miniature type, employ high speed expensive Sealex machines for sealing the lamp envelope, mount and exhaust tubulation and exhausting the sealed lamp. The heads on the inner periphery of a rotatable turret rotates through a plurality of work stations at which the lamp envelope may be joined with the lamp mount therebetween, by means of a butt seal to a constricted exhaust tubulation. The sealed lamp is then transferred to an exhaust head on the outer periphery of the turret which is indexed through a plurality of exhaust stations. These machines have an elaborate pumping system operable through an oil sealed rotary valve to the plurality of exhaust heads on the turret.

Considering the small volume involved in a miniature incandescent lamp of the vacuum type, it does not seem necessary to employ such large expensive pumping equipment for the evacuation or exhaust of such lamp types. Neither is it logical to employ an elaborate pumping system extending from large backer pumps through oil diffusion pumps, connecting sweeps to a rotary valve and thence through sweeps on the rotatable turret to the exhaust heads (which carries the sealed lamp undergoing exhaust) to evacuate the small volume involved.

Hence, it has been found advantageous according to our invention to employ a method and apparatus for exhausting incandescent lamps without the use of complicated apparatus involving mechanical vacuum and oil diffusion pumps. Our freeze-out method of exhaust consists of flushing an exhaust manifold with a gas having a low vapor pressure at the temperature of a liquid coolant well below 0° C., while simultaneously heating the exhaust manifold to drive out water vapor and other deleterious gases therefrom. The clean manifold is then immersed in the liquid coolant causing the temperature of the gas filled exhaust manifold to fall well below 0° C., to the temperature of the coolant and produce a very low vapor pressure within the exhaust manifold. An incandescent lamp, which is to be exhausted, is then affixed to the exhaust manifold and simultaneously flushed with the gas and baked to drive out any water vapor and deleterious gases from the vitreous envelope and the exhaust tubulation of the lamp. After the simultaneous flushing and baking operation of the lamp, the filled lamp is then connected to the evacuated exhaust manifold. The residual gas within the lamp flows into the exhaust manifold and the vapor pressure within the lamp is reduced by means of the liquid coolant to a very low vapor pressure. The lamp is then tipped-off from the exhaust manifold and suitably based and tested.

In addition to eliminating the use of a complicated vacuum pumping system our method and apparatus has the added advantage of positive removal (by freeze-out) of water vapor from incandescent lamps. Complete removal of this deleterious vapor prevents lamp blackening due to water vapor during the life of the lamp.

In its general aspect the present invention has as its objective an improved method and apparatus for exhausting incandescent lamps.

A specific object of the present invention is a method and apparatus for exhausting incandescent lamps without the use of expensive automatic high speed machines having mechanical and oil diffusion pumps.

A further object is a freeze-out method and apparatus for exhausting incandescent lamps.

An additional object is the complete removal of deleterious water vapor from incandescent lamps during exhaust by the freeze-out method to prevent lamp blackening during the life of the lamps.

Other objects of the present invention will become apparent to those skilled in the art to which it appertains as the description thereof proceeds.

Referring to the drawings in which like numerals of reference indicate similar parts throughout the several views:

Fig. 1 is a side elevational view of a vitreous exhaust manifold undergoing simultaneous gas flushing and heating to remove water vapor and other deleterious gases therefrom.

Fig. 2 is a side elevational view of the flushed gas filled exhaust manifold immersed in a liquid coolant to exhaust (or to produce a low pressure within) the exhaust manifold at the temperature of the liquid coolant.

Fig. 3 is a side elevational view of an incandescent lamp affixed to the evacuated exhaust manifold and showing the simultaneous heating and flushing of the lamp with gas to remove water vapor and deleterious gases therefrom.

Fig. 4 is a side elevational view showing the gas-filled lamp connected to the exhaust manifold and undergoing evacuation or exhaust by the freeze-out method.

Fig. 5 is a side elevational view of the tipping-off operation of the lamp after the exhaust has been completed.

Referring to the drawing and more particularly to Figs. 3, 4 and 5 the reference numeral 10 designates an incandescent lamp which, for purposes of illustration only, is indicated as a miniature incandescent lamp of the vacuum type, such as employed for flashlight applications.

This lamp 10 has a vitreous envelope 12 to which an exhaust tubulation 14 is sealed with lead wires 16 of a filament mount 18 therebetween. Although an incandescent lamp of the miniature type is shown, it will be understood that the method and apparatus of our invention is applicable and adaptable to the exhaust of incandescent lamps of the larger type.

Flushing and baking exhaust manifold

Referring now to Fig. 1, a generally U-shaped exhaust manifold 30 of, for example, a vitreous material (such as Pyrex) has its body portion immersed within a baking oven or heater 32 carried by a bracket (not shown). A suitable valve or stop cock 34 is provided in the upper (handily) reduced portion of the right hand leg or arm (when viewed in Fig. 1) of the manifold 30. The valve 34 is in turn connected by a tube 35 to a suitable gas supply (not shown).

We have found that carbon dioxide, for example, is a satisfactory gas for our freeze-out method and apparatus of exhausting incandescent lamps. Carbon dioxide has a very low vapor pressure at the temperature of the liquid coolant which we employ. It will be understood that carbon dioxide being heavier than air (having a molecular weight of 44 as compared to the molecular weight 29 of air) permits a gravity flow during the flushing operations employed in our invention. It will be further understood that if a gas lighter than air is employed (instead of carbon dioxide) the apparatus of Figs. 1 through 5 must necessarily be inverted to satisfactorily effect the discharge of the relatively heavier air being flushed from the exhaust manifold and lamp parts.

The valve or stop cock 34 is of the one-way type and merely permits or shuts off the flow of carbon dioxide gas from the carbon dioxide supply (not shown) into the body of the exhaust manifold 30.

The upper portion 36 of the other or left hand (when viewed in Figs. 1 and 2) leg of the U-shaped exhaust manifold 30 is of reduced diameter and bent in the shape of an inverted U. The portion 36 carries a two-way valve or stop cock 38 on its lower end which projects beyond the oven or furnace 32. This valve 38 carries an upper and lower lamp flush tube 40 and 42 respectively, which projects from the body of the valve 38.

It will be understood that the valve 38 is capable of connecting the U-shaped tube 36 to the lower flush tube 42 or of connecting the upper and lower flush tubes 40 and 42. In the showing of Fig. 1 the lower portion of the lower flush tube 42 carries means 44 for securing thereto in hermetic engagement the exhaust tube 14 of a lamp 10 as hereinafter explained and shown in Figs. 3, 4, and 5. The means 44 for purposes of illustration and simplicity consists of a rubber hose or nipple.

Although a rubber nipple 44 has been shown in the illustration of the drawings, it will be understood that the lower flush tube 42 may connect to an exhaust head of the conventional type such as is shown and described in U. S. Patent No. 1,210,620 entitled "Exhausting Machine" issued to J. T. Fagan et al. and assigned to the General Electric Company.

With the valve 38 in position to permit the passage of the gas from the U-shaped tube 36 into the lower flush tube 42 and the valve 34 in the open position, the exhaust manifold 30 is simultaneously flushed with carbon dioxide gas. The pressure, sufficient to cause a flow through the manifold 30 is, for example, approximately 1000 mm. of Hg absolute. Simultaneously the exhaust manifold 30 is maintained by the oven 32 at a temperature between 450° and 600° C. for about 10 minutes to remove the water vapor and other deleterious gases occluded within the exhaust manifold 30. At the conclusion of this time, the valve 34 is closed shutting off the flow of carbon dioxide from the supply (not shown). The valve 38 is moved to the neutral position, shown in Fig. 2, disconnecting the gas filled exhaust manifold 30 from the lower flush tube 42.

*Exhausting exhaust manifold*

The flushed and baked exhaust manifold 30 filled with carbon dioxide gas to a pressure slightly above atmospheric, is then immersed within a liquid coolant 50 contained within a suitable insulated vacuum type flask 52 (Fig. 2). This flask 52 is supported or carried by a suitable holder 54 upstanding from the floor or a nearby table (not shown).

The liquid coolant 50 may, for example, be liquid nitrogen having a temperature of about $-193.6°$ C. Within a matter of minutes (under ideal hermetic conditions within our exhaust apparatus) the vapor pressure of the carbon dioxide gas within the exhaust manifold 30 is reduced by the liquid coolant 50 to a pressure of about .0003 micron or $3 \times 10^{-7}$ mm. of mercury. Due to the nature of the connectors and the valves employed in our experimental exhaust apparatus we have found that a pressure of less than one micron produces satisfactory lamps.

*Flushing and baking of incandescent lamps*

While the exhaust manifold 30 is undergoing our freeze-out method of exhaust (or simultaneously therewith), an incandescent lamp 10 may be secured by means of its tubulation 14 to the connecting means or rubber hose 44 on the lower flush tube 42 of the valve 38. A flush tube 60 (Fig. 3) having a relatively thin hypodermic needle-like delivery end 62 is then inserted into the upper flush tube 40, through the valve 38 and into the lower flush tube 42. The gas, in this case carbon dioxide flows into the tube 60 from a supply (not shown).

It will be understood that the diameter of the delivery tube 62 is relatively smaller than the inner diameter of the flush tubes 40 and 42, and the connecting portion of the valve 38 to permit the exhaust of the flushed gas between the outer wall of the delivery tube 62 and the inner wall of these above mentioned parts.

A suitable oven 64 (Fig. 3) is then positioned about the lamp 10. Simultaneously carbon dioxide gas at a relatively low pressure, such as 1000 mm. of Hg absolute, flows into the lamp 10 and the lamp 10 is heated to a temperature between 400° C. and 500° C. for about one minute to remove water vapor and other deleterious occluded gases from the vitreous portions of the lamp 10.

*Lamp exhaust*

At the conclusion of the simultaneous flushing and baking of the lamp 10 the hypodermic-like needle delivery tube 62 is withdrawn from the tubes 40 and 42 and the valve 38. The valve 38 is turned to connect the lower portion of the U-shaped tube 36 with the lower flush tube 42 and hence, in turn to the flushed and baked lamp 10 (filled with carbon dioxide gas) in the rubber 44 therebelow (as shown in Fig. 4).

It will be remembered that the pressure within the exhaust manifold 30 is approximately $3 \times 10^{-7}$ mm. of mercury under ideal conditions and less than 1 micron under experimental conditions. As soon as the lamp 10 is connected to the exhaust manifold 30, the gas contained therein readily flows into the exhaust manifold 30. In a very short time, a matter of minutes, the pressure within both the lamp 10 and the exhaust manifold 30 is about $3 \times 10^{-7}$ mm. of mercury under the ideal conditions.

*Tip-off*

As shown in Fig. 5 the exhausted lamp 10 may be tipped-off at the constriction in the conventional manner by means of a tip-off burner 70. The lamp is then suitably based, seasoned and tested.

It will be understood that the carbon dioxide gas employed in our freeze-out method and apparatus for exhausting incandescent lamps will remain moisture free as long as the temperature of the exhaust manifold 30 remains below 0° C. Thus, the moisture free carbon dioxide gas may be recovered and used again to exhaust other incandescent lamps 10.

It will be further understood that the exhaust manifold 30 need be baked and flushed and exhausted by the freeze-out method prior only to exhausting the first of a series of incandescent lamps 10 undergoing exhaust.

Although a preferred embodiment of our invention has been described, it will be understood that modifications may be made within the spirit and scope of the invention.

We claim:

1. A method of exhausting an incandescent lamp comprising baking, flushing and filling an exhaust manifold with a gas having a very low vapor pressure in the order of about .0003 micron at a temperature of about $-190°$ C., immersing said manifold in a liquid coolant having a temperature of about $-190°$ C. to reduce the vapor pressure in said manifold to less than one micron, simultaneously baking, flushing and filling said lamp with said gas, connecting said gas filled lamp to said exhaust manifold to reduce the pressure of said lamp and said exhaust manifold to less than one micron and tipping-off said lamp from said exhaust manifold.

2. A method of exhausting an incandescent lamp comprising baking, flushing and filling an exhaust manifold with carbon dioxide gas, immersing said manifold in a liquid coolant having a temperature of about $-190°$ C. to reduce the vapor pressure in said manifold to less than one micron, simultaneously baking, flushing and filling said lamp with said gas, connecting said gas filled lamp to said exhaust manifold to reduce the pressure of said lamp and said exhaust manifold to less than one micron and tipping-off said lamp from said exhaust manifold.

3. A method of exhausting an incandescent lamp comprising baking, flushing and filling an exhaust manifold with a gas having a very low vapor pressure in the order of about .0003 micron at a temperature of about −190° C., immersing said manifold in liquid nitrogen to reduce the vapor pressure in said manifold to less than one micron, simultaneously baking, flushing and filling said lamp with said gas, connecting said gas filled lamp to said exhaust manifold to reduce the pressure of said lamp and said exhaust manifold to less than one micron and tipping-off said lamp from said exhaust manifold.

4. Apparatus for exhausting an incandescent lamp comprising means for containing a liquid coolant having a temperature of about −190° C., an exhaust manifold substantially within said coolant, means on said exhaust manifold for flushing said manifold with a gas having a vapor pressure of about .0003 micron at about −190° C., a two-way valve on said exhaust manifold, means on said valve for flushing said lamp with said gas, lamp securing means on said flushing means for hermetically securing said lamp thereto, and baking means about said lamp, said valve being capable of alternatively connecting said flushing means and said lamp and said exhaust manifold and said lamp.

References Cited in the file of this patent

UNITED STATES PATENTS 2,235,510    Watrous _____ Mar. 18, 1941